Figure 1:
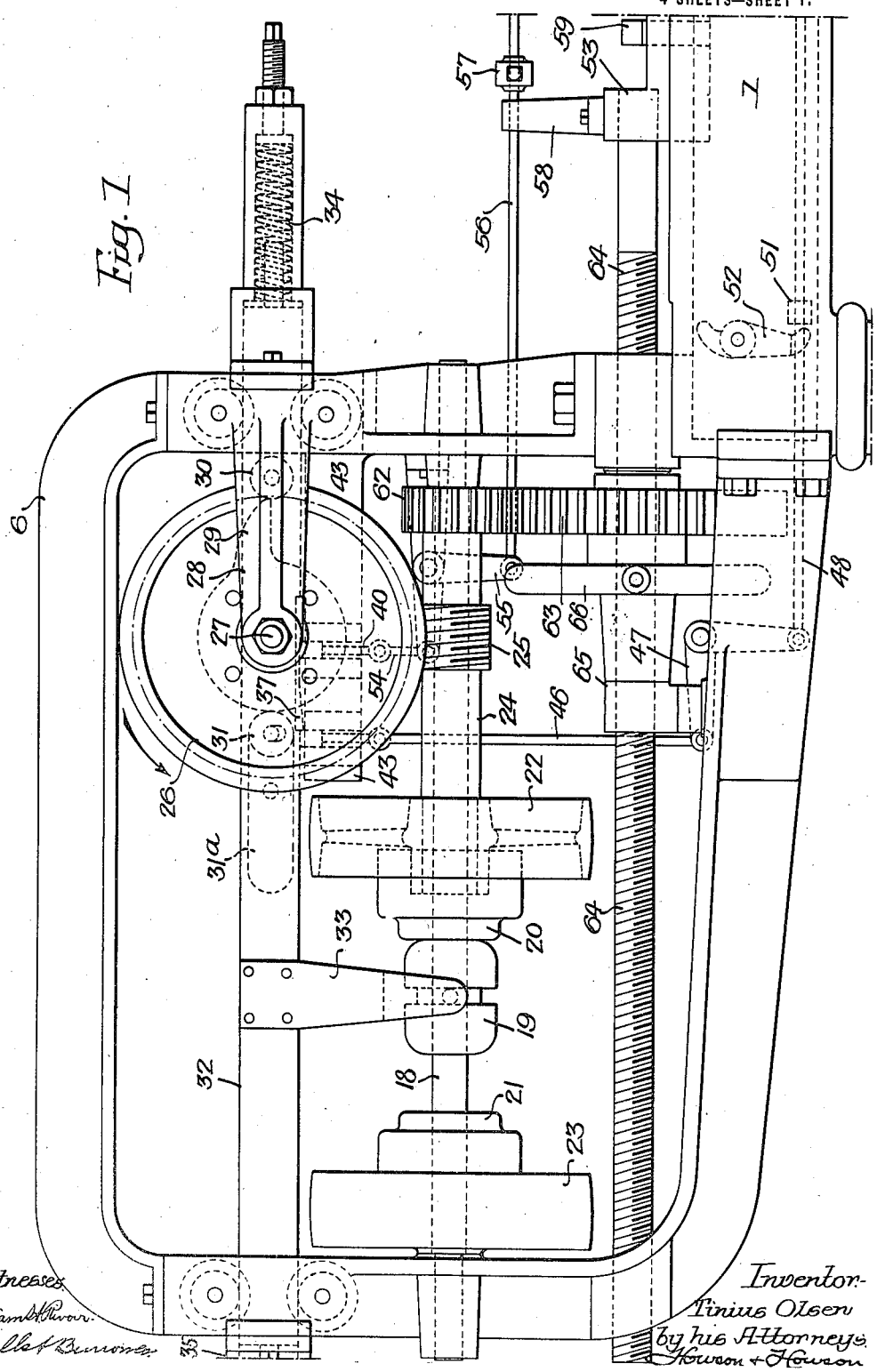

T. OLSEN.
PROOF TESTING MACHINE.
APPLICATION FILED JAN. 14, 1913.

1,141,822.

Patented June 1, 1915.
4 SHEETS—SHEET 1.

Witnesses

Inventor
Tinius Olsen
by his Attorneys
Howson + Howson

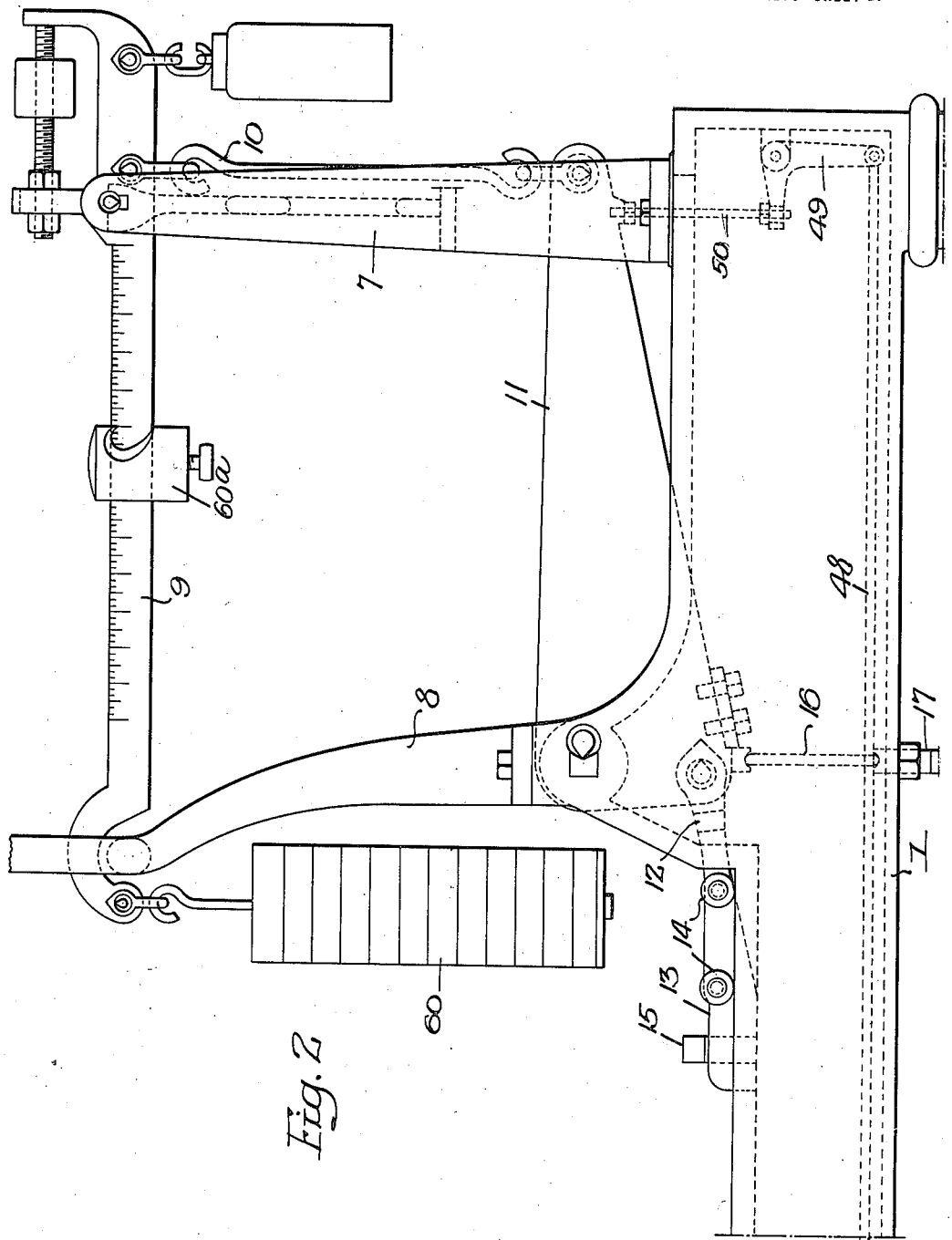

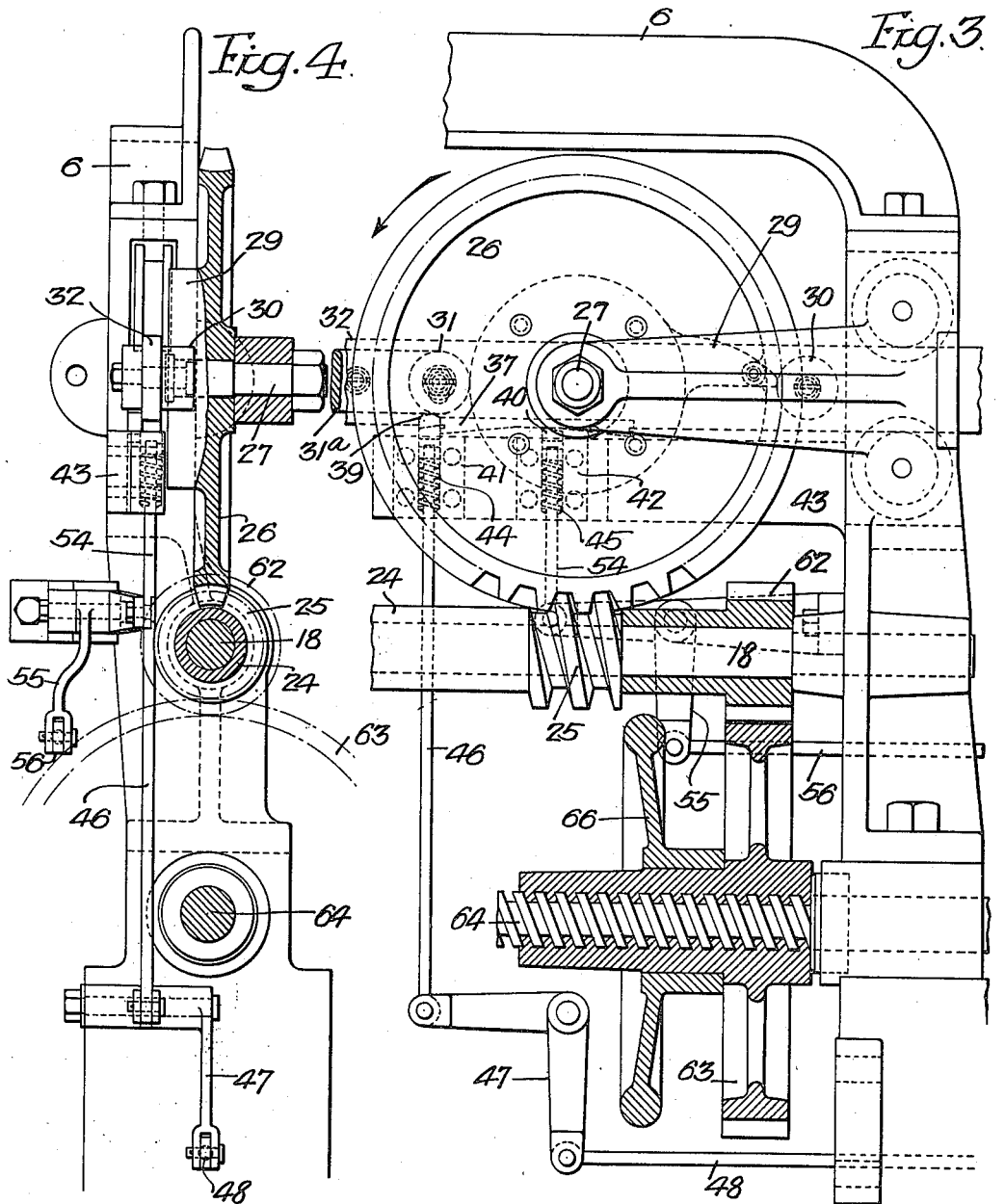

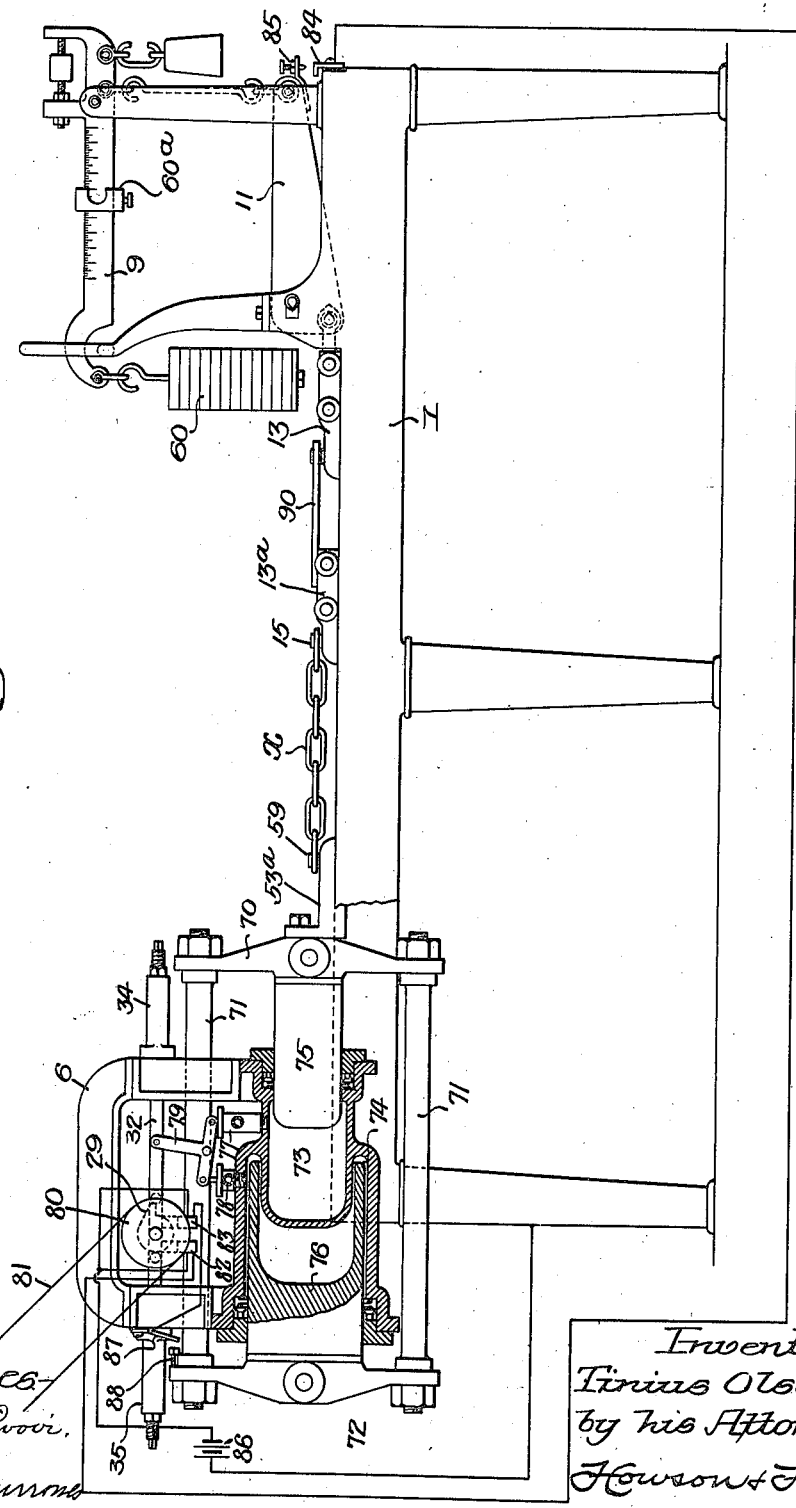

UNITED STATES PATENT OFFICE.

TINIUS OLSEN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

PROOF-TESTING MACHINE.

1,141,822.   Specification of Letters Patent.   Patented June 1, 1915.

Application filed January 14, 1913. Serial No. 741,981.

*To all whom it may concern:*

Be it known that I, TINIUS OLSEN, a citizen of the United States, residing in Philadelphia, Pennsylvania, have invented certain Improvements in Proof-Testing Machines, of which the following is a specification.

One object of this invention is to provide a novel machine for applying to a body such as a chain or any other structure under test, a predetermined stress less than the breaking strength of said body or structure, the arrangement of parts being such that successive lengths of the object or structure under test may be quickly and conveniently operated on.

Another object of my invention is to provide a machine which after a length of material to be tested is properly positioned, shall automatically apply a predetermined stress thereto and thereafter remove said stress, the various parts being returned to such positions as will fit them to receive another test piece or body.

I further desire to provide a testing machine having the above noted characteristics with novel mechanism for applying a tensile stress to a body to be tested and thereafter automatically removing said stress; the invention also contemplating a movable carriage or head, and mechanism for automatically reciprocating the same at regular intervals.

Another object of my invention is to provide a testing machine which shall include mechanism for reciprocating a carriage or head and a device for automatically stopping movement of said head after a test body or piece attached thereto has been exposed to a predetermined stress or when the proof stress has been reached.

I also desire to provide a machine particularly designed for applying a predetermined stress or proof stress to successive lengths of chain, the parts of said machine being so arranged that it operates continuously, is provided with means for preventing injury under abnormal conditions of operation, is simple as well as substantial in construction and not likely to require any but a minimum of attention and repairs.

These objects and other advantageous ends I secure as hereinafter set forth, reference being had to the accompanying drawings, in which, Figures 1 and 2 together are a side elevation of a testing machine constructed according to my invention; Fig. 3 is a side elevation partly in section and on an enlarged scale, illustrating certain of the details of the machine; Fig. 4 is an end elevation, partly in section; and Fig. 5 is a side elevation partly in section illustrating a modified form of my invention.

In Figs. 1 to 4 of the above drawings, 1 represents an elongated hollow bed or base mounted on legs or other suitable supports having at one end an open vertically extending frame 6 and at the opposite end two columns or brackets 7 and 8. At this latter end is mounted lever mechanism for actuating the scale beam indicated at 9 which is mounted in the well known manner on bracket 7. A link 10 connects this scale beam with the long arm of the main lever 11 whose short arm is connected through a link 12 with a head or carriage 13. This latter has two pairs of wheels or rollers 14 operative on the top surface of the base structure 1, which is longitudinally slotted to serve as a guide way for the bottom of this carriage. Said carriage carries a post 15 for the reception of one end of the chain to be tested although it will be understood that other forms of test piece engaging members may be employed without departing from my invention.

In order to properly support the lever 11, I provide a strut 16 engaging the lower end of its short arm and itself supported by an adjustable bolt 17 mounted in the lower member of the base structure 1, the ends of said strut being round and fitting into cup shaped depressions in said bolt and in the lever 11.

Mounted in bearings in the frame 6 is a driving shaft 18 having splined to it a movable clutch member 19 designed to co-act with either of two fixed clutch members 20 and 21 of any suitable construction and respectively attached to or forming part of pulleys 22 and 23 driven in opposite directions by any suitable means. Said shaft 18 has keyed to it a pinion 62 meshing with a gear 63 whose hub is threaded for the reception of a screw 64 guided in bearings on the frame and operatively connected to a second carriage 53 slidable on the main frame 1 under the action of said screw.

Said gear is confined between one side of the frame and a bearing 65 carried by the bottom frame member; there being a hand wheel 66 fixed to the hub of said gear wheel to permit of its revolution and the consequent hand adjustment of the screw 64 and its carriage 53.

Both of the pulleys 22 and 23 are loosely mounted on the shaft 18 and the pulley 22 is fixed to an elongated sleeve 24 forming part of or connected to a worm 25 meshing with a worm wheel 26 carried by a spindle 27 supported by an arm 28 fixed to the frame 6. This worm wheel carries a cam 29 so designed as to be capable of engaging two rollers 30 and 31 mounted on a longitudinally movable shifter bar 32 which has an arm 33 engaging the movable clutch member 19. This bar is slidable in anti-friction bearings on the frame 6 and its opposite ends are acted on by springs 34 and 35 carried in casings supported by said frame so as to tend to move the bar to and hold it in a definite position in which the clutch member 19 is midway between and disengaged from both clutch members 20 and 21. The roller 31 is carried by an arm 31ª pivoted to the shifter bar 32 so that it can have a vertical movement when engaged by the cam 29.

The shifter bar has at its lower edge a projecting portion in the form of a plate 37 whose ends extend below the line of said edge to form latch catches and whose under side is inclined upwardly from its ends, as shown in Fig. 3. Coöperating with this plate are two latches 39 and 40 respectively guided in bearings 41 and 42 carried by an arm 43 projecting from one side of the frame 6. These latches are respectively forced toward the shifter bar 32 by springs 44 and 45.

The latch 39 is connected through a rod 46, a bell crank lever 47, a link 48, a second bell crank lever 49 and a rod 50 with the long arm of the main lever 11; the arrangement of parts being such that when this arm moves downwardly (as when the long arm of the scale beam 9 moves up) the latch 39 is withdrawn from engagement with the latch catch.

The second latch 40 is connected through a rod 54, and a bell crank lever 55 to a bar 56, carrying an adjustable stop 57 and partly supported as well as acted on by an arm 58 of the carriage 53. This latter is provided with a post 59 shaped in the present instance for the reception of a chain link, although it is obvious that like the other carriage, it may be provided with other forms of holding or gripping devices without departing from this invention.

It will be understood that the scale beam 9 is graduated in any desired manner and is loaded with weights 60 to any predetermined extent, depending on the stress to be applied to the chain or other structure under test.

Assuming that the shifter bar 32 is in its mid position, the clutch member 19 is disengaged from both of the clutch members 20 and 21 which are driven in opposite directions from a suitable source of power. Under these conditions the worm 25 is turned in such a direction that the worm wheel and with it the cam 29, is turned in the direction of the arrow, Fig. 1. In the course of its revolution, said cam comes into engagement with the roll 30 and forces it with the shifter bar 32 toward the right until the latch 39 finally drops behind the left hand latch catch under the action of its spring 44. When in this position the shifter bar holds the clutch member 19 in engagement with the clutch member 20 so that power is transmitted to the shaft 18, and the pinion 62 on said shaft, together with the gear 63 are turned, causing longitudinal movement of the screw 64 with the carriage 53 toward the left.

It will be noted that after the cam 29 has disengaged the roller 30, the shifter bar remains in a position with the clutch members 19 and 20 in engagement by reason of the locking action of the latch 39, and when the link 48 is moved toward the right, this latch, through the bell crank lever 49 and the rod 54, is withdrawn from engagement with the latch catching portion or plate 37, so that under the action of the spring 34 the shifter bar with the clutch member 19 is moved to its mid position. Rotation of the shaft 18 and hence of the screw 64 is thus stopped, as is also movement of the carriage 53. The continued rotation of the worm 25 and worm wheel 26 finally causes the cam 29 to come into engagement with the roller 31, forcing it with the shifter bar 32 to the left, thus coupling the clutch members 19 and 21 and causing the shaft 18 to be driven by power from the pulley 23 in a direction opposite to that hitherto noted. The screw 64, through the pinion 62 and gear 63, is thus moved to the right, as soon as the clutch members 19 and 21 are coupled, and such movement is continued by reason of the latch 40 locking the shifter bar in its extreme left hand position. The carriage 53 continues to be moved to the right until its arm 58 acts on the collar 57 and rod 56 to such an extent that the latch 40 is withdrawn from engagement with the latch catch 37, whereupon the forward movement of said carriage is stopped since the spring 35 restores the shifter bar to its mid position and thereafter disengages the clutch members 19 and 21. As the worm wheel 26 and cam 29 continue their revolution, said cam engages the roller 30, moving the shifter bar from its mid position to the right and again coupling the clutch members 19 and 20, with the result that the carriage 53 is moved toward the left as previously described.

The link 48 carries a collar 51 in position to be engaged by one arm of a lever 52 which is fulcrumed on the main frame 1, and under certain predetermined abnormal conditions, it may be engaged by the second carriage 53, in such a manner as to cause the latch 39 to be disengaged from the latch catch 37, with the results previously noted.

From the above it will be seen that carriage 53 is continuously moved toward and from the carriage 13, although there is a temporary cessation of its movement at the two extremes of its stroke. When it is desired to apply predetermined stress to a chain for example, the pulleys 22 and 23 are driven as previously noted and after the carriage 53 has been moved to its position nearest the carriage 13, a chain is applied to the two posts 15 and 59, the scale beam 9 having been previously weighted to a predetermined extent.

As the machine goes through its cycle of operations, the carriage 53 is moved away from the carriage 13 by the action of the screw 64 and when the stress on said chain has reached the predetermined amount, the long arm of the scale beam 9 is raised against the action of the weights 60 and 60$^a$, thus permitting the long arm of the main lever 11 to move downwardly. Such downward movement is transmitted through the rod 50, bell crank lever 49, link 48, lever 47 and rod 46 to the latch 39, which is thus disengaged from the plate 37, whereupon the clutch members 19 and 20 are disconnected as heretofore described. It will be noted from the above description that as soon as the predetermined stress was applied to the chain or body under test, there was no further movement apart of or increase of the stress exerted upon the carriages 53 and 13 so that the chain or other body under test is not exposed to any greater stress than that which it was desired to apply. Thereafter, the continued revolution of the cam 29 shortly brings the clutch members 19 and 21 into engagement and by thus causing the screw 64 to be moved to the right, slides the carriage 53 toward the carriage 13, thus permitting the tested length of chain to be disengaged from the posts 15 and 59. Another length of chain may then be immediately applied to said posts, which are again moved apart as previously described in order to apply the test or proof stress to the same.

Should the chain fall under test, the carriage 53 would be stopped in its movement toward the left by being brought into engagement with the lever 52 as above described. The apparatus thus automatically operates to apply and remove only the stress which has been predetermined by the loading of the scale beam, it being merely necessary that the operator should apply to and remove from the posts 15 and 59, the lengths of material under test.

It is to be understood that forms of mechanism other than that heretofore described may be employed for applying and removing as well as controlling a proof stress and I have illustrated one such possible form of mechanism in Fig. 5, in which the head or carriage 53$^a$ is connected to hydraulic apparatus whereby the predetermined stress is applied to the chain or other body to be tested. In this figure the carriage 53$^a$ is attached to the cross head 70 and connected by tie rods 71 to a second cross head 72. The frame of the machine supports a structure having two cylinders 73 and 74 of which the first coöperates with a plunger 75 connected to the cross head 70 while the second coöperates with a plunger 76 connected to the cross head 72. Two valves 77 and 78 for controlling the flow of motive fluid toward and from the two cylinders 73 and 74 are operatively connected to two arms of a lever 79 whose third arm is attached to the shifter bar 32. As heretofore described, this bar carries two rollers or projecting structures 30 and 31 to be alternately engaged by the rotary cam 29 which in this instance is directly driven from a pulley 80 continuously actuated from a belt 81 or from any other source of power. In this case the engagement of the two latches 39 and 40 with the shifter bar 32 is controlled by two electro-magnets 82 and 83. The first of these is connected in circuit with an electric switch one of whose members 84 is mounted on the frame of the machine in such position as to be engaged by a second switch member 85 carried by the long arm of the lever 11 when the end of said arm moves downwardly and the long arm of the scale beam 9 moves up. This second switch member 85 is grounded on the frame of the machine as is also one terminal of a battery or other source 86 of electric current. The second terminal of this battery is connected to both of the magnets 82 and 83 and the second terminal of the latter of said magnets is connected to a spring contact 87 mounted on but insulated from the frame of the machine and in such position that it is engaged by a grounded contact 88 on the cross head 72 when this, with its plunger 76, is in the extreme right hand position. In this case I have shown the chain receiving post 15 as mounted on a supplementary head or carriage 13$^a$ and connected by a link 90 with the carriage 13, which as before described is in turn attached to the short arm of the lever 11.

With this arrangement of parts the revolution of the cam 29 by the pulley 80 as before causes a reciprocation of the shifter bar 32, and when this is in the extreme right hand position shown, the valve 78 supplies motive fluid to the cylinder 74. A length of chain X connecting the two posts 15 and 59 is thereafter subjected to stress since the carriage 53$^a$ is moved to the left, by reason of the plunger being forced out of its cylinder 74. Such stress continues until the long arm of the scale beam 9 is raised, at the moment that the applied stress reaches the desired predetermined amount, for the long arm of the lever 11 moves down when the scale beam moves up and closes the switch 84—85, thus energizing the electromagnet 82 and withdrawing the latch 39. The shifter bar is thereupon immediately returned to its mid position with both of the valves 77 and 78 closed so that no additional motive fluid can pass to the cylinder 74 and no further stress is applied to the body under test.

The continued revolution of the cam 29 thereafter causes the shifter bar 32 to be moved from its mid position to the extreme left, thus supplying motive fluid to the cylinder 73 and permitting that in the cylinder 74 to escape. As a result, the plunger 75 is forced toward the right, thus moving the carriage 53$^a$ toward the carriage 13$^a$ and permitting the removal of the tested length of chain as well as the application of a new length of chain to the posts 15 and 59. The movement to the right of the plunger 75 with the cross heads 70 and 72 continues until the contact 88 engages the contact 87, whereupon the latch 40 is withdrawn from engagement with the shifter bar, which is again returned to its mid position as heretofore described. The cam 29, by again engaging the roller 30, will thereafter move the shifter bar 32 to the extreme right, bringing the valves into the positions shown in Fig. 6 and causing movement of the carriage 53$^a$ to the left. In any case, it will be noted that the application of stress is automatically stopped by the weighing system of the apparatus when the proof load is reached and one of the heads or carriages is thereafter automatically returned to its position nearest the other carriage so as to permit of the removal of the tested body and the subsequent application of another body to be tested, whereupon it is again actuated to apply the predetermined proof load.

If for any reason the latch 39 should not be withdrawn from the latch catch 37 before the cam 29 engages the roller 31, the plate or bar 31$^a$ would be turned on its pivot by such engagement of the parts and said roller would be moved down sufficiently to force the latch 39 free from said latch catch. The shifter bar is thus unlocked and moved as before described without injury to the machine.

I claim:—

1. The combination in a testing machine of two members for engaging a body to be tested; loaded lever mechanism connected to one of said members; power actuated stressing mechanism operative on the other member; with means connecting said two sets of mechanism and including a device for causing the latter mechanism to apply to the body under test, a stress less than its breaking strength and thereafter automatically remove the same.

2. The combination in a testing machine of members for engaging a body to be tested; loaded lever mechanism connected to one of said members; means for automatically reciprocating the other member; and a device connecting said means with the lever mechanism for rendering the reciprocating means inoperative when the stress on the body engaged thereby has reached a predetermined point less than its breaking strength.

3. The combination in a testing machine of two members for engaging a body to be tested; power actuated means for moving one of said members toward and from the other; loaded lever mechanism operative on the other of said members; and means connected with the lever mechanism for automatically stopping the stressing action of the means for moving the first member when a predetermined stress has been applied to the body under test.

4. The combination in a testing machine of two members for engaging a body to be tested; power actuated means for moving one of said members relatively to the other to apply a tensile stress to said body; a device for measuring the stress applied; and means controlled by said device for automatically cutting off the moving power from said member when the body has been subjected to a predetermined stress less than its ultimate tensile strength.

5. The combination in a testing machine of two members for engaging a body to be tested; mechanism for automatically reciprocating one of said members through a predetermined path to apply a tensile stress to a body under stress; and means controlled by said device for automatically stopping movement of said member before it has completed its possible path of movement in order to limit the stress applied to the body under test.

6. The combination in a testing machine of two members for engaging a body to be tested; mechanism for automatically reciprocating one of said members through a predetermined path to apply stress to said body; load controlling mechanism connected to the second member; and a device connected to said latter mechanism for automatically stopping movement of the first member before it has completed its possible path of movement.

7. The combination in a testing machine of a frame; two heads mounted thereon; lever mechanism, including a scale beam, attached to one of said heads; power operated mechanism for moving the other head; and a device controlled by the lever mechanism for stopping operation of said head moving mechanism when a predetermined stress has been applied to a body engaged by said heads.

8. The combination in a testing machine of two heads having means for engaging a body to be tested; mechanism for continuously reciprocating one of said heads; and means controlled by said head for causing the reversal of its movement when it has reached a predetermined point.

9. The combination in a testing machine of two heads having means for engaging a body to be tested; means for reciprocating one of said heads; and two devices for respectively causing reversal of the movement of said head at the opposite ends of its stroke.

10. The combination in a testing machine of two heads; means for reciprocating one of said heads; two devices for respectively causing reversal of the movement of said head at the opposite ends of its stroke; and lever mechanism connected to the other head operative on one of said devices for causing a temporary cessation of the movement of the first head when the structure engaged thereby has been subjected to a predetermined stress.

11. The combination in a testing machine of two heads; a driving shaft connected to one of the heads for reciprocating the same; members for driving said shaft in either of two directions; continuously driven mechanism for alternately connecting said members to the shaft; and means for automatically disconnecting the shaft from one of the driving members when the stress applied to the body engaged by the heads reaches a predetermined amount less than its breaking strength.

12. The combination in a testing machine of two heads; a screw connected to one of said heads; two members driven in opposite directions; clutches for connecting said shaft to either of said members; a shifter bar for actuating said clutches; a continuously driven cam for alternately moving the shifter bar in opposite directions; and means operative under predetermined conditions for automatically causing movement of the shifter bar to a position in which the shaft is disconnected from both clutches.

13. The combination in a testing machine of two heads; means for reciprocating one of said heads; controlling mechanism for said means including a shifter bar; springs tending to move said bar to a predetermined neutral position in which the head is disconnected from said reciprocating means; a member for reciprocating said shifter bar; and loaded lever mechanism connected to the second head for automatically causing movement of the shifter bar to its neutral position when a predetermined stress has been applied to a body engaged by said heads.

14. The combination in a testing machine of two heads; a shifter bar; means controlled by said bar for reciprocating one of said heads; a device for reciprocating the shifter bar through a predetermined path; a latch for holding said bar at a definite point of its path of movement; and automatic means for tripping said latch when a predetermined stress has been applied to a body engaged by said heads.

15. The combination in a testing machine of two heads engaging a body to be tested; a shifter bar; means controlled by said shifter bar for reciprocating one of the heads; a device for reciprocating the shifter bar; two latches for temporarily holding the bar at definite points of its path of movement; a device controlled by said latter head for tripping one of said latches when the head has moved a predetermined distance in one direction; and a second device for tripping the other latch when a predetermined stress has been applied to a body engaged by said heads.

In testimony whereof, I have signed my name to this specification, in the presence of two subscribing witnesses.

TINIUS OLSEN.

Witnesses:
WILLIAM E. BRADLEY,
WM. A. BARR.